US008123406B2

(12) United States Patent
Erickson et al.

(10) Patent No.: US 8,123,406 B2
(45) Date of Patent: Feb. 28, 2012

(54) EXTERNALLY ADJUSTABLE IMPINGEMENT COOLING MANIFOLD MOUNT AND THERMOCOUPLE HOUSING

(75) Inventors: Dean Matthew Erickson, Simpsonville, SC (US); Mitch Mircea Orza, Roswell, GA (US); Michael George Savale, Queensbury, NY (US); Hua Zhang, Greer, SC (US)

(73) Assignee: General Electric Company, Schenectady, NY (US)

( * ) Notice: Subject to any disclaimer, the term of this patent is extended or adjusted under 35 U.S.C. 154(b) by 687 days.

(21) Appl. No.: 12/267,952

(22) Filed: Nov. 10, 2008

(65) Prior Publication Data

US 2010/0118914 A1 May 13, 2010

(51) Int. Cl.
*G01K 7/00* (2006.01)
*F01D 25/12* (2006.01)

(52) U.S. Cl. ......... 374/179; 374/141; 415/118; 415/176

(58) Field of Classification Search .................. 374/179, 374/141; 415/118, 115, 176
See application file for complete search history.

(56) References Cited

U.S. PATENT DOCUMENTS

| | | | | |
|---|---|---|---|---|
| 2,650,753 | A * | 9/1953 | Howard et al. | 415/137 |
| 4,251,185 | A * | 2/1981 | Karstensen | 415/136 |
| 4,435,093 | A * | 3/1984 | Krause et al. | 374/129 |
| 5,116,199 | A * | 5/1992 | Ciokajlo | 415/173.2 |
| 5,281,085 | A * | 1/1994 | Lenahan et al. | 415/116 |
| 5,685,158 | A * | 11/1997 | Lenahan et al. | 60/726 |
| 6,007,303 | A * | 12/1999 | Schmidt | 417/223 |
| 6,546,735 | B1 * | 4/2003 | Moniz et al. | 60/773 |
| 6,997,673 | B2 * | 2/2006 | Morris et al. | 415/1 |
| 7,309,209 | B2 * | 12/2007 | Amiot et al. | 415/173.2 |
| 7,914,254 | B2 * | 3/2011 | Erickson et al. | 415/118 |
| 2009/0053035 | A1 * | 2/2009 | Zhang et al. | 415/1 |
| 2009/0068007 | A1 * | 3/2009 | Erickson et al. | 415/213.1 |

* cited by examiner

*Primary Examiner* — Christopher Fulton
(74) *Attorney, Agent, or Firm* — Cantor Colburn LLP

(57) ABSTRACT

A mount includes a mounting bolt attached to a casing; an internal bushing that engages the casing at a distal end of the internal bushing; and an external bushing that engages a manifold and engages the internal bushing. The internal bushing is adjustable with respect to the external bushing thereby allowing the manifold to be adjustable with respect to the casing.

20 Claims, 6 Drawing Sheets

EXTERNALLY ADJUSTABLE IMPINGEMENT COOLING MANIFOLD MOUNT AND THERMOCOUPLE HOUSING

BACKGROUND OF THE INVENTION

The subject matter disclosed herein relates to gas turbines and, more particularly, to an adjustable mount for an air impingement cooling manifold for a gas turbine.

Air impingement cooling is used to manage the casing temperature of a gas turbine and to reduce and maintain the clearances between rotating blades and accompanying interior casing surfaces. The cooling of the casing in general needs to be relatively uniform to avoid undesired non-roundness and local stress concentration. The efficiency of cooling is affected by various air impingement cooling configurations. One problem with air impingement cooling configurations on gas turbines is the difficulty in achieving a relatively uniform heat transfer coefficient across large, non-uniform, non-standard casing surfaces. On some gas turbines, small impingement holes and relatively short nozzle to surface distances are applied. While these features may produce the required higher heat transfer coefficients on the casing, a problem with the use of relatively small impingement cooling holes is the need for operating with a relatively high differential pressure drop across the holes. This results in the requirement for undesirable high cooling air supply pressures which negatively impacts net efficiency for gas turbines. Also, relatively smaller holes and shorter hole to surface distances have detrimental cross flow and an inadvertent effect on cooling efficiency of constant coolant flow rate. Consequently, a high pressure blower may be needed with added system capital and operational cost.

One known air impingement cooling configuration includes a plurality of manifolds affixed to the turbine casing directly above the target cooling area. The manifolds are typically affixed to the turbine casing using mounts. Cooling air is provided to the manifolds, which have a series of air impingement holes formed in a lower plate of each manifold. The size and positioning of the impingement holes on the lower plates are selected to produce a relatively uniform and desired heat transfer coefficient across the turbine casing targeted for cooling by the air impingement cooling system. With this type of manifold cooling system, the distance between the lower plate of each manifold and the turbine casing determines the cooling of the casing achieved by the manifolds. However, the mounts that affix the manifolds to the casing are problematic in that they do not allow for any adjustment of the gap distance between the lower plate of the manifold and the turbine casing while the manifold is mounted to the casing. The mount gap distance can only be adjusted with the manifolds removed from the casing. This results in an undesirable, time consuming trial and error method needed to achieve the desired gap distance between the lower plate and the casing. That is, typically the manifolds need to be placed on and off the casing several times until the desired gap distance and, thus, the proper amount of cooling of the casing is achieved.

BRIEF DESCRIPTION OF THE INVENTION

According to one aspect of the invention, a mount includes a mounting bolt attached to a casing; an internal bushing that engages the casing at a distal end of the internal busing; and an external bushing that engages a manifold and engages the internal bushing, the internal bushing being adjustable with respect to the external bushing thereby allowing the manifold to be adjustable with respect to the casing.

According to another aspect of the invention, a mount for mounting a manifold having a pair of spaced apart plates to a casing, one of the plates located closest to the casing having a plurality of cooling holes formed therein, the mount includes a mounting bolt attached to a casing; an internal bushing that engages the casing at a distal end of the internal bushing; and an external bushing that engages a manifold and threadably engages the internal bushing, the internal bushing being adjustable with respect to the external bushing thereby allowing the manifold to be adjustable with respect to the casing.

According to yet another aspect of the invention, a method includes attaching a mounting bolt to a casing; engaging an internal bushing with the casing; and engaging an external bushing with the manifold and with the internal bushing, the internal bushing being adjustable with respect to the external bushing thereby allowing the manifold to be adjustable with respect to the casing.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
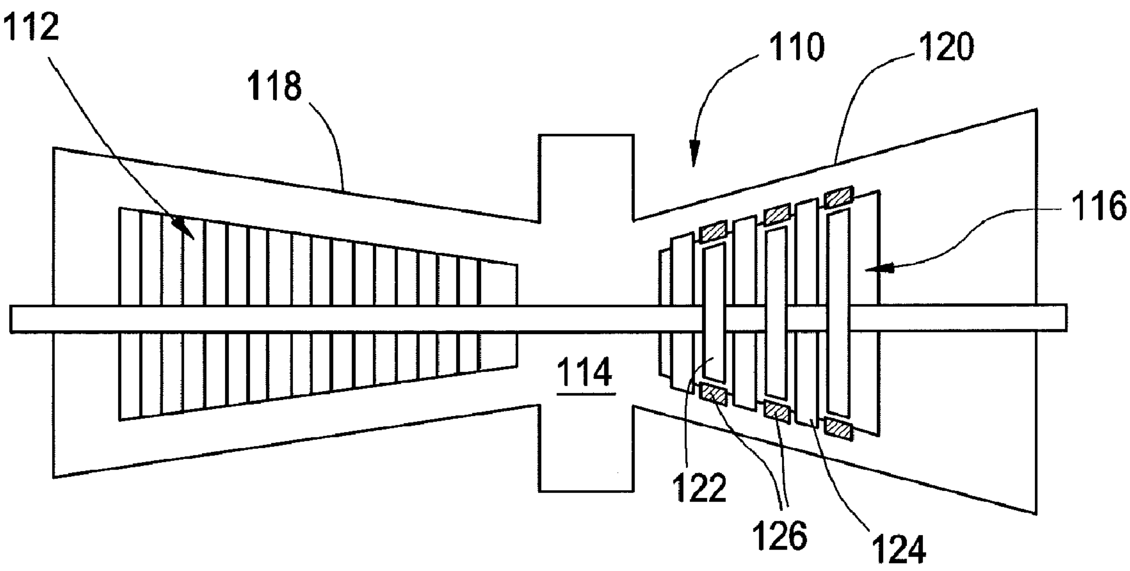
FIG. 1 is a cross-section view of a gas turbine.

FIG. 1 illustrates an embodiment of a gas turbine 110. The gas turbine includes a compressor section 112, combustor section 114, and a turbine section 116. The turbine 110 also includes a compressor casing 118 and a turbine casing 120. The turbine and compressor casings 118, 120 enclose major parts of the gas turbine 110. The turbine section 116 includes a shaft and a plurality of sets of rotating and stationary turbine blades.

Figure 2:
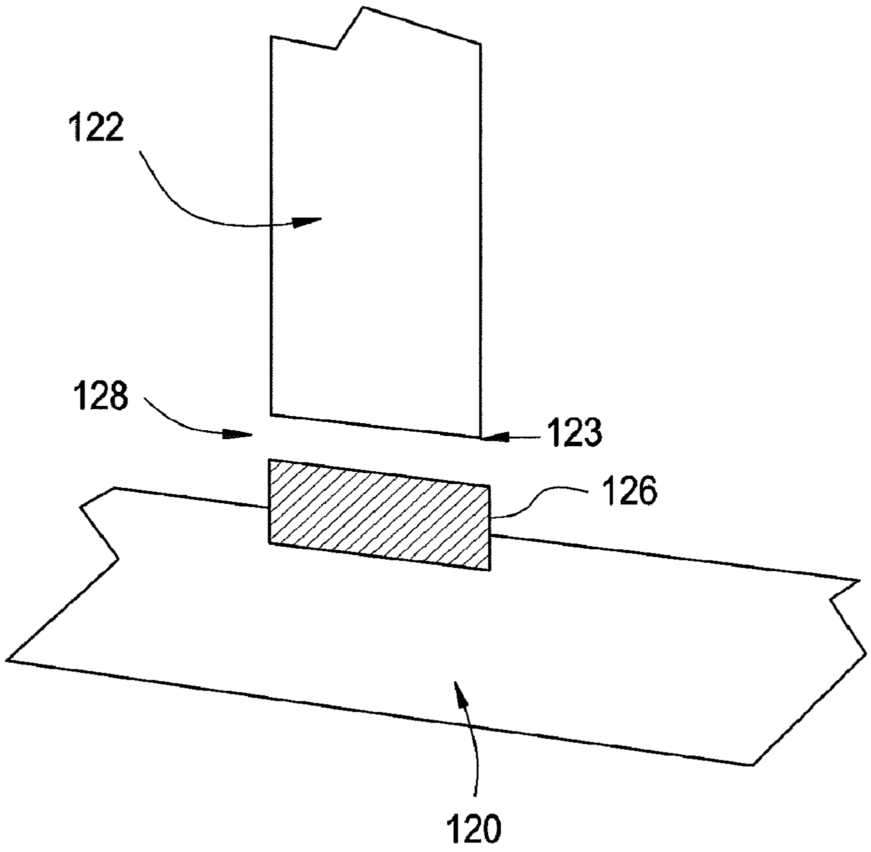
FIG. 2 is a detailed view of the turbine blade to shroud clearance in the gas turbine of FIG. 1.

Referring to FIGS. 1 and 2, the turbine casing 120 may include a shroud 126 affixed to the interior surface of the casing 120. The shroud 126 may be positioned proximate to the tips of the rotating turbine blades 122 to minimize air leakage past the blade tip. The distance between the blade tip 123 and the shroud 126 is referred to as the clearance 128. It is noted that the clearances 128 of each turbine stage are not consistent due to the different thermal growth characteristics of the blades and casing during operation of the gas turbine.

A contributor to the efficiency of gas turbines is the amount of air/exhaust gas leakage through the blade tip to casing clearance 128. Due to the different thermal growth characteristics of the turbine blades 122 and turbine casing 120, clearances 128 significantly change as the turbine transitions through transients from ignition to a base-load steady state condition. A clearance control system, including its operating sequence, may be implemented to address the specific clearance characteristics during all operating conditions. Incorrect design and/or sequencing of the control system may lead to excessive rubbing of the turbine blade 123 tips with the casing shrouds 126, which can result in increased clearances and reduced performance.

Figure 3:
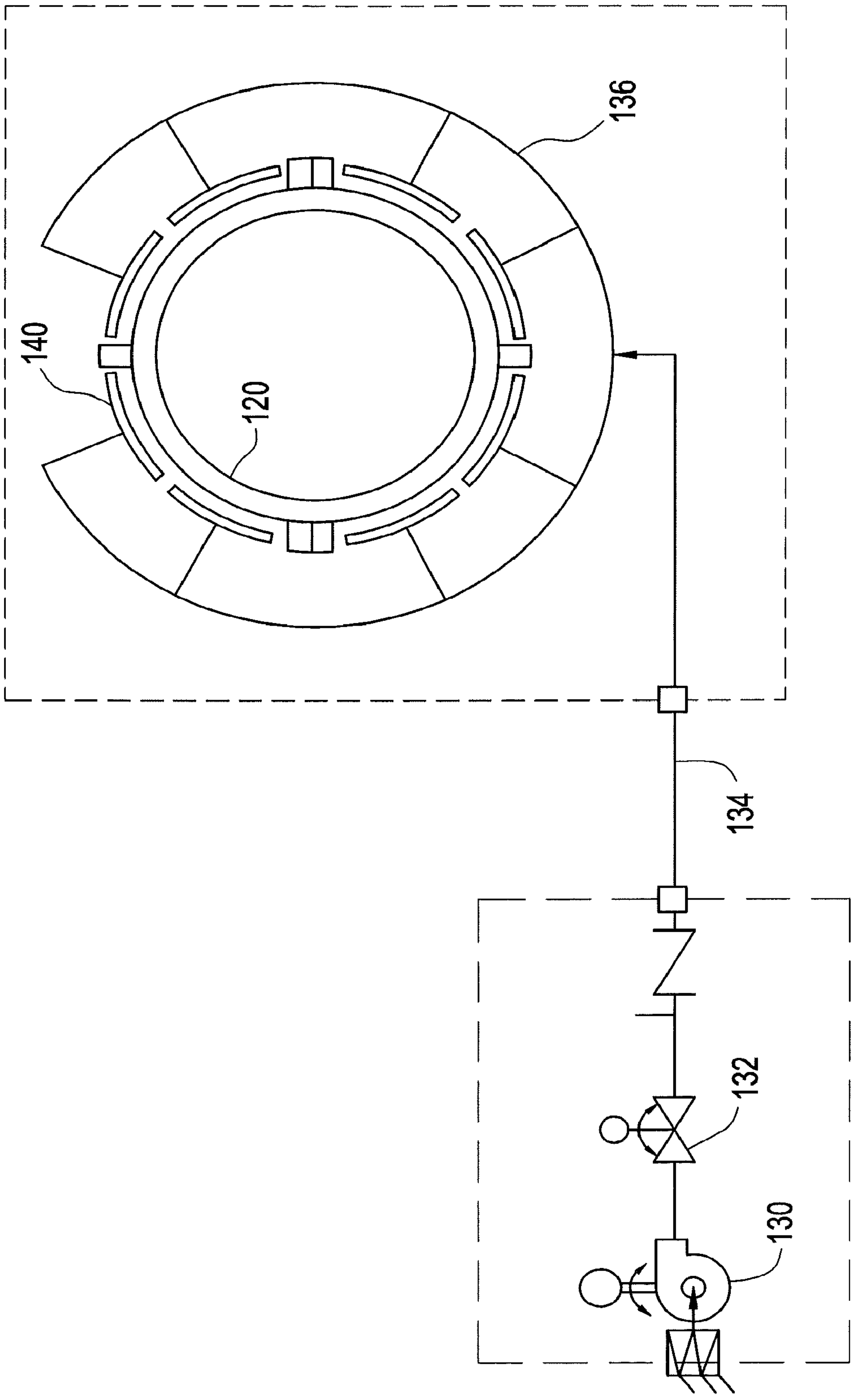
FIG. 3 is an impingement cooling system implemented on the gas turbine of FIG. 1.

As illustrated in the exemplary embodiment of FIG. 3, an impingement air-cooling system may be used to reduce and maintain the clearances between the turbine shroud 126 and the accompanying blade tip 123. The impingement air-cooling system may comprise a blower 130, a flow control damper 132, interconnect piping 134, a distribution header 136, and a series of impingement cooling manifolds 140. The impingement cooling manifolds 140 are affixed to the turbine casing 120. In the exemplary embodiment of FIG. 3, a plurality (e.g., eight) of impingement manifolds 140 are affixed about the circumference of the turbine casing 120. The impingement cooling blower 130 takes suction from ambient air and blows the air through the flow control damper 132, interconnect piping 134, distribution header 136, and into the impingement cooling manifolds 140. The blower 130 may be any blowing device including a fan or a jet. The impingement cooling manifold 140 provides for a relatively uniform heat transfer coefficient to be delivered to the turbine casing 120. It should be appreciated that the impingement air-cooling system is not limited to the components disclosed herein but may include any components that enable air to pass along the impingement cooling manifolds 140.

Figure 4:
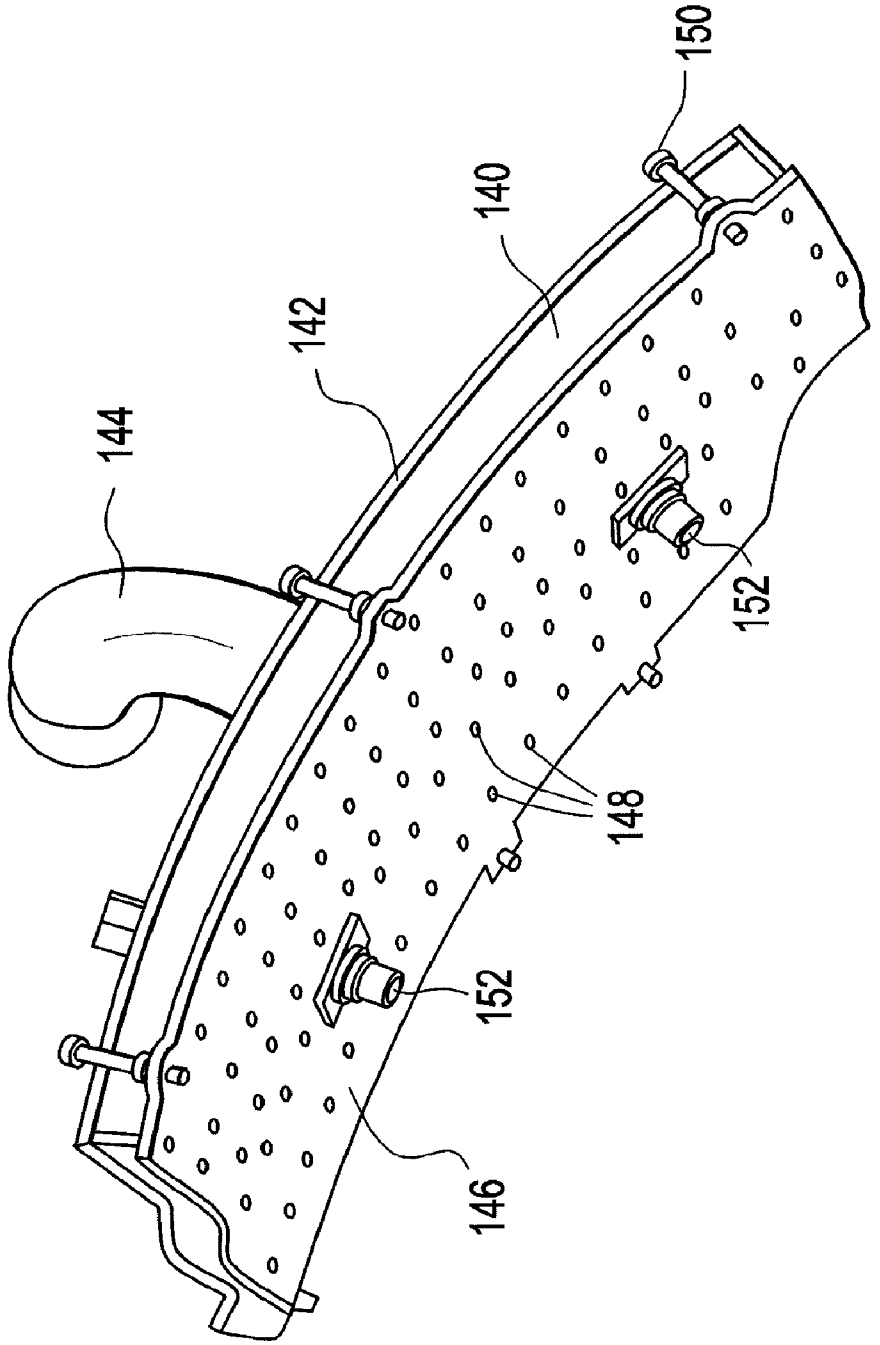
FIG. 4 is a cross-section view of an impingement cooling manifold that is part of the impingement cooling system of FIG. 3.
Figure 5:
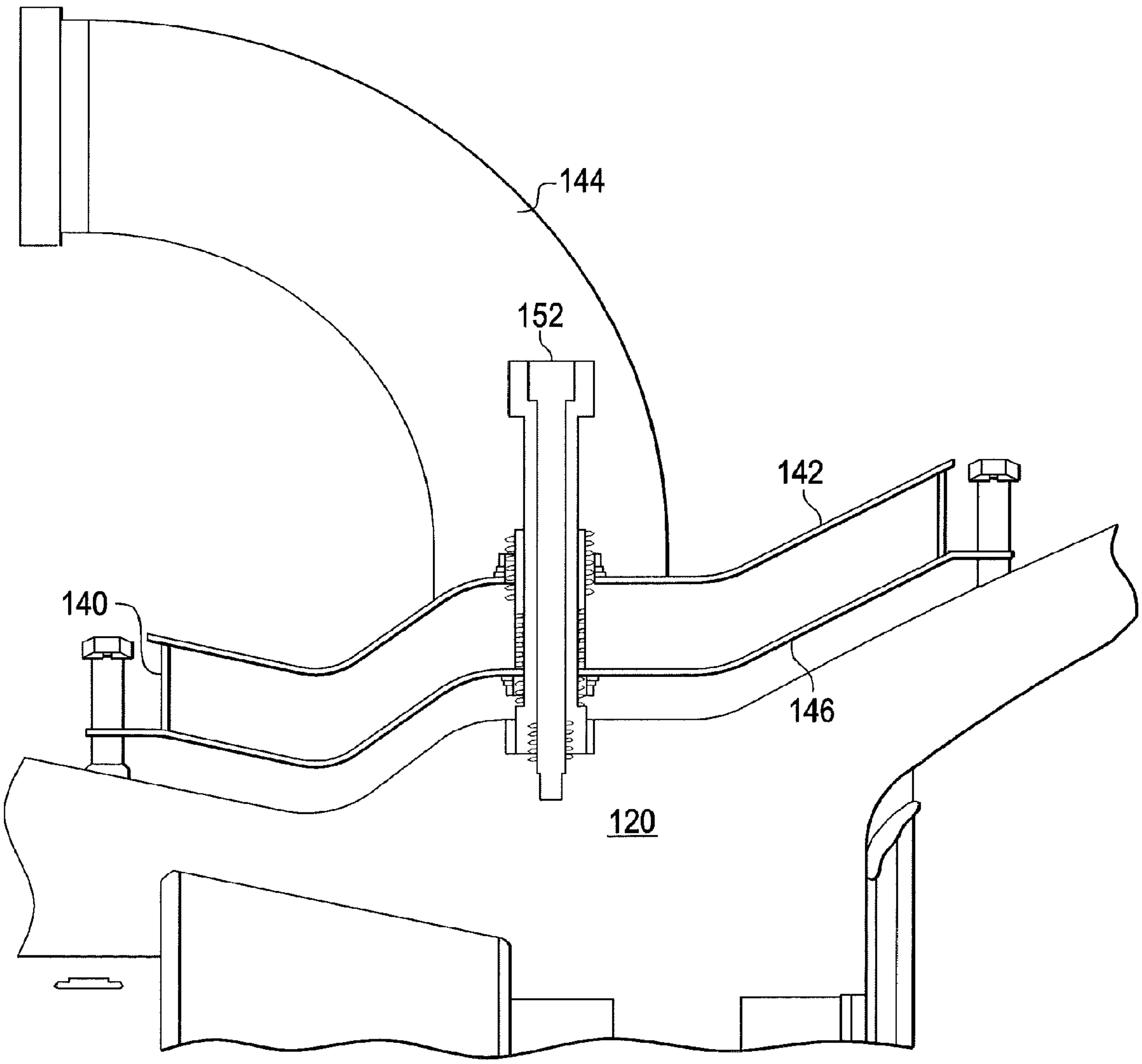
FIG. 5 is a detailed cross-section view of the impingement cooling manifold of FIG. 4.

Referring to the exemplary embodiment illustrated in FIGS. 4 and 5, the impingement cooling manifolds 140 may be designed to the contours of the target area of the turbine casing 120. Each impingement cooling manifold 140 may include an upper plate 142 with an air feed pipe 144, a lower plate 146 with multiple impingement holes 148, side pieces, leveling legs 150, and hold down supports or mounts 152. The mounts 152 (and, thus, the manifolds 140) are externally adjustable according to an embodiment of the invention and the mounts 152 are described and illustrated in more detail hereinafter with respect to FIGS. 6-9. The impingement holes 148 permit the air to flow from the impingement cooling manifold 140 to the turbine casing to selectively cool the turbine casing.

The impingement holes 148 may be positioned in an array. In an exemplary embodiment, the impingement holes 148 may be spaced in the range from 1.25 to 2.5 inches, and the individual impingement holes 148 may be sized between 0.12 and 0.2 inches. The varying hole sizes and spacing are required to compensate for the non-uniformity of the geometry of the turbine casing 120. The size and positioning of the impingement holes 148 on the lower plate 146 produce a uniform heat transfer coefficient across the casing 120 targeted by the impingement air-cooling system. However, the impingement holes are not limited to these sizes or spacings. The distance between the upper 142 and lower plates 146 also may be dimensioned to reduce internal pressure variations, which results in relatively more uniform cooling hole pressure ratios.

The gap distance between each impingement cooling manifold lower plate 146 and the turbine casing 120 affects the heat transfer coefficient. Too large of a gap can result in an undesirable heat transfer coefficient. Too little of a gap can result in both an undesirable and a non-uniform heat transfer coefficient. In an exemplary embodiment, a gap of between 0.5 and 1.0 inch provides a suitable heat transfer coefficient. However, the gap is not limited to this range and may be any distance that provides a suitable heat transfer coefficient. As described in greater detail hereinafter, the mounts 152, according to embodiments of the invention, provide for an external adjustment of the gap distance between the manifold lower plate 146 and the turbine casing 120 while the manifolds 140 are mounted or affixed to the turbine casing 120.

An exemplary embodiment of a gas turbine may include a plurality of impingement cooling manifolds 140. The manifolds 140 may be affixed to the casing 120 of the turbine directly above the target cooling area on the casing 120. The impingement cooling manifolds 140 may be positioned such that there is ample spacing between their edges and any protrusions off of the casing. This provides a free path for the air passing through the impingement holes 148 to exhaust from under the impingement cooling manifold 140 to the environment. In an exemplary embodiment, the spacing between two adjacent impingement cooling manifolds may be between 1 to 30 inches and is dependent on casing protrusions and flanged joints. The spacing is not limited to these dimensions and may be spaced at any suitable distance. The impingement cooling manifolds 140 also may provide impingement cooling to any of the axial flanges, including a horizontal split joint.

Figure 6:
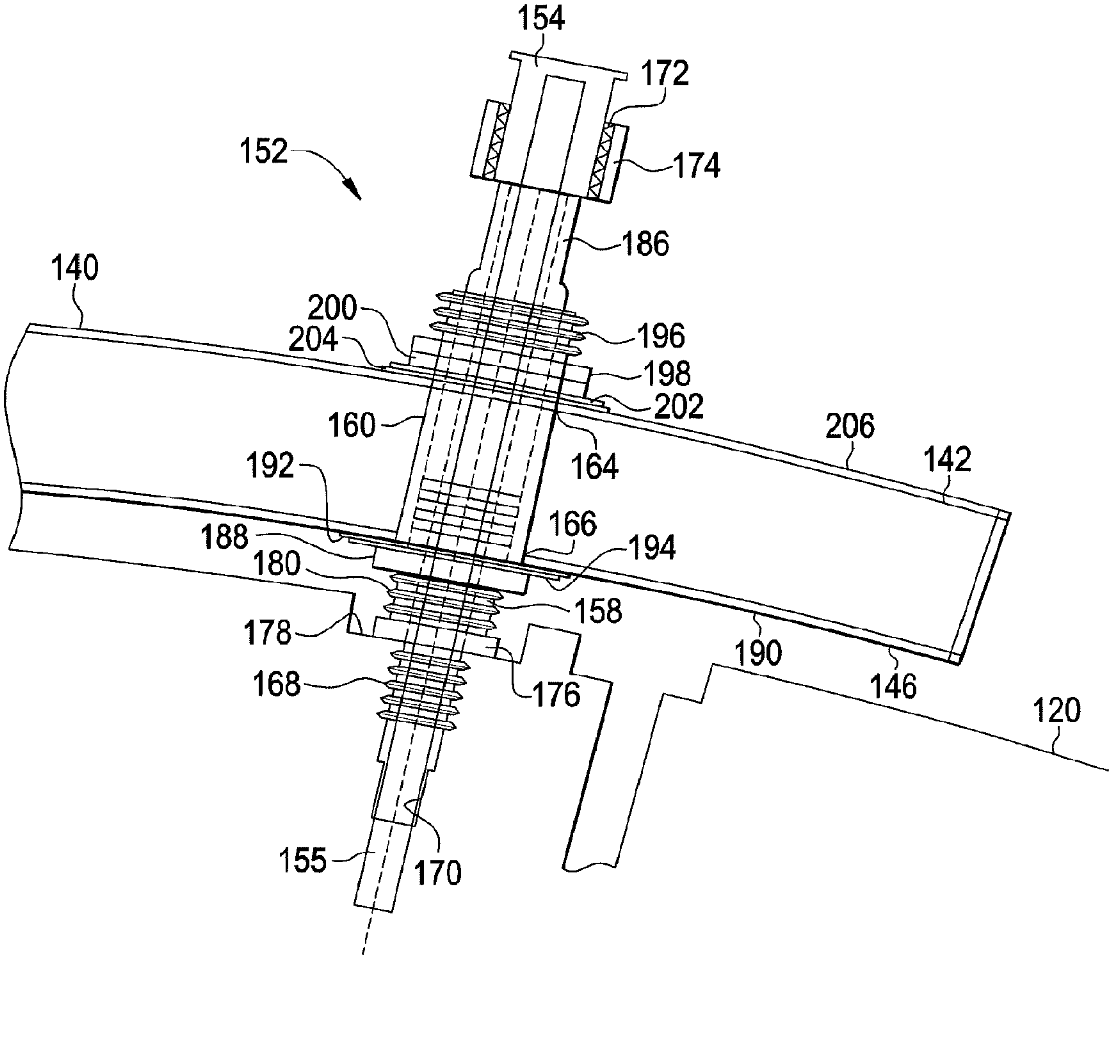
FIG. 6 is a detailed view of a mount according to an embodiment of the invention for the impingement cooling manifold of FIGS. 4 and 5.
Figure 7:
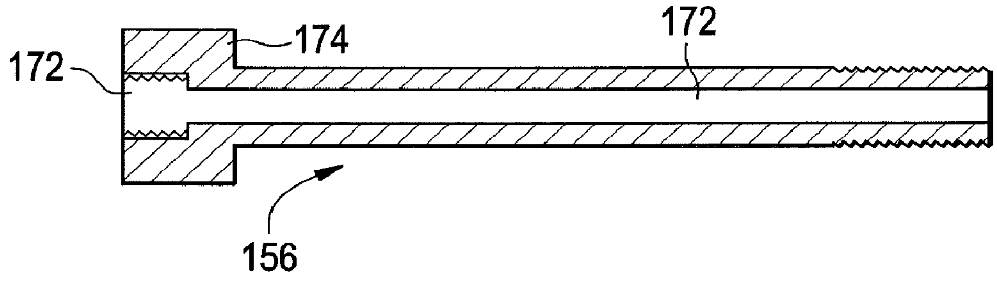
FIG. 7 is a cross-section view of a mounting bolt and thermocouple holder that is part of the mount of FIG. 6.
Figure 8:
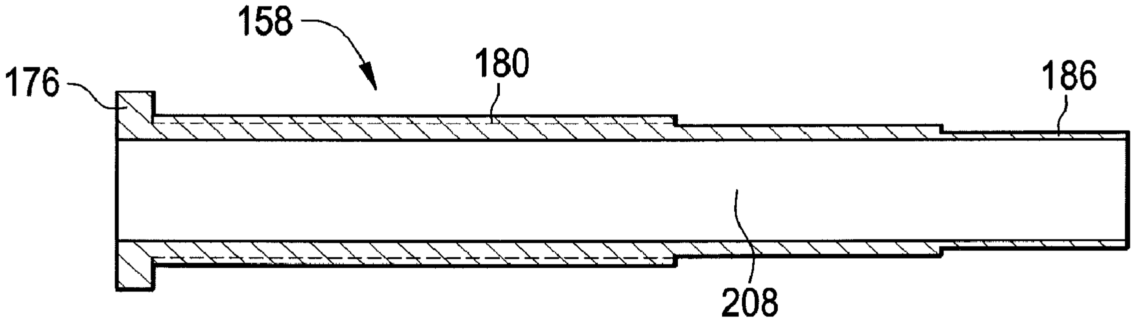
FIG. 8 is a cross-section view of an internal bushing that is part of the mount of FIG. 6.
Figure 9:
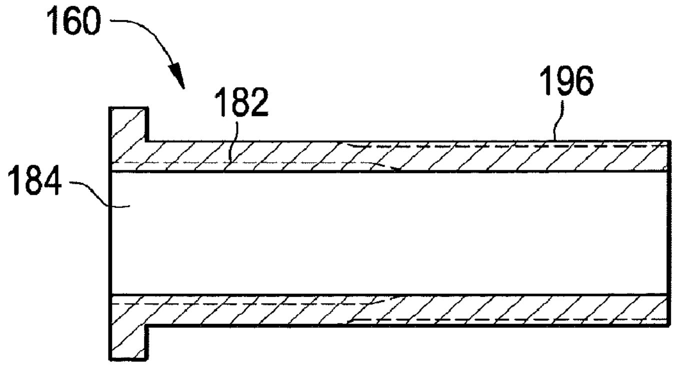
FIG. 9 is a cross-section view of an external busing that is part of the mount of FIG. 6.

Referring to FIG. 6, the mount 152 according to an embodiment of the invention is illustrated in more detail. In embodiments of the invention, the mounts 152 function to hold or support the manifolds 140 (in particular, the impingement holes 148 formed in the lower plate 146 of the manifold 140) at a predetermined gap distance from the surface of the turbine casing 120. The mounts 152 also function as a well or holder for a thermocouple 154 that monitors the temperature of the turbine casing 120. Referring also to FIGS. 7-9, the mount 152 comprises an assembly of various components that include a mounting bolt 156 (FIG. 7) that also holds the thermocouple 154, an internal bushing 158 (FIG. 8), and an external bushing 160 (FIG. 9).

The mount 152 is located through a hole 164 in the upper plate 142 of the manifold 140 and a hole 166 in the lower plate 146 of the manifold 140. The mounting bolt 156 includes a threaded distal end 168 that engages a threaded counter bore 170 formed in the turbine casing 120 to secure the mount 152 to the casing 120. The thermocouple body 154 is threaded or affixed in a threaded or tapped well or bore 172 within a hex head 174 located at the proximal end of the mounting bolt 156. The bore 172 continues unthreaded through the entire length of the mounting bolt 156. The thermocouple 154 includes a thin rod or wire 155 disposed through the length of the bore 172, where the rod 155 terminates in the counter bore 170 in the casing 120. The rod 155 makes contact with the casing 120 in the counter bore 170 below the threaded engagement of the mounting bolt 156 with the casing 120, thereby allowing for measurement of the temperature of the casing 120.

The internal bushing 158 includes a flange 176 at a distal end that sits on a surface 178 of the casing 120. The internal bushing includes external male threads 180 along a portion of its length. The threads 180 engage with internal female threads 182 along a portion of a bore 184. The proximal end of the internal bushing 158 includes a flat portion 186 that is used to adjust the position or gap distance of the manifold 140 with respect to the casing 120, in accordance with embodiments of the invention as described hereinafter. The flat portion 186, which may take any other suitable shape besides flat, extends beyond the external busing 160 to allow access to the flat portion 186 by someone who desires to adjust the gap distance using, e.g., a wrench.

The distal end of the external bushing 160 includes a flange 188 that engages a surface 190 of the lower manifold plate 146 through use of a graphite gasket 192 and a sheet metal washer 194. The proximal end of the external bushing 160 includes external male threads 196 along a portion of its length. The threads 196 engage with two jam nuts 198, 200 located next to one another and also next to a sheet metal washer 202 and a graphite gasket 204. The graphite gasket 204 engages a surface 206 of the upper plate 142 of the manifold 140. The external bushing 160 is located through the hole 164 in the upper plate 142. The mounting bolt 156 passes through an internal bore 208 along the entire length of the internal bushing 158.

In use, after the manifold 140 has been assembled or mounted to the turbine casing 120 using the mount 152 of embodiments of the invention, the gap distance of the lower plate 146 of the manifold from the casing 120 can be varied without having to remove the manifold 140 from the casing 120, as mentioned above with known designs. Instead, the gap distance can be varied with the manifold 140 mounted to the casing 120 through use of a wrench or other suitable tool that grabs onto the flat portion 186 of the internal bushing 158 and then turning the internal bushing 158 in either a clockwise or counter-clockwise direction. As such, the external threads 180 of the internal bushing 156 "run" or are adjustable with respect to the internal threads 182 of the external bushing 160, thereby adjusting the gap distance of the manifold 140 with respect to the turbine casing 120.

The mount 152 according to embodiments of the invention described and illustrated herein provides for improved manifold to casing gap distance clearance control and reduces the installation time when the manifolds 140 are mounted to the casing 120 both during the initial fit-up and during subsequent manifold re-installations. Relatively improved and tighter tolerances during the re-installations may also be maintained by the mounts 152.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A mount, comprising:
- a mounting bolt attached to a casing;
- an internal bushing that engages the casing at a distal end of the internal bushing; and
- an external bushing that engages a manifold and engages the internal bushing, the internal bushing being adjustable with respect to the external bushing thereby allowing the manifold to be adjustable with respect to the casing.

2. The mount of claim 1, the mounting bolt further including a well at a proximal end of the mounting bolt for a thermocouple.

3. The mount of claim 2, the mounting bolt further including an internal bore for a wire of the thermocouple.

4. The mount of claim 1, the mounting bolt attached to the casing by threads.

5. The mount of claim 1, the internal bushing including a bore through which the mounting bolt is located.

6. The mount of claim 1, the internal bushing being adjustable with respect to the external bushing by threads located on the internal bushing and threads located on the external bushing.

7. The mount of claim 1, the internal bushing including a portion that is rotatable by an external tool to adjust the internal bushing with respect to the external bushing.

8. The mount of claim 1, the external bushing being mounted to the manifold by external threads on the external bushing and by at least one nut that threadably engages the external threads on the external bushing.

9. A mount for mounting a manifold having a pair of spaced apart plates, comprising:
- a mounting bolt attached to a casing;
- an internal bushing that engages the casing at a distal end of the internal bushing; and
- an external bushing that engages the manifold and threadably engages the internal bushing, the internal bushing being adjustable with respect to the external bushing thereby allowing the manifold to be adjustable with respect to the casing.

10. The mount of claim 9, the mounting bolt further including a well at a proximal end of the mounting bolt for a thermocouple.

11. The mount of claim 10, the mounting bolt further including an internal bore for a wire of the thermocouple.

12. The mount of claim 9, the mounting bolt attached to the casing by threads.

13. The mount of claim 9, the internal bushing including a bore through which the mounting bolt is located.

14. The mount of claim 9, the internal bushing being adjustable with respect to the external bushing by threads located on the internal bushing and threads located on the external bushing.

15. The mount of claim 9, the internal bushing including a portion that is rotatable by an external tool to adjust the internal bushing with respect to the external bushing.

16. The mount of claim 9, the external bushing being mounted to the manifold by external threads on the external bushing and by at least one nut that threadably engages the external threads on the external bushing.

17. A method, comprising:
- attaching a mounting bolt to a casing;
- engaging an internal bushing with the casing; and
- engaging an external bushing with a manifold and with the internal bushing, the internal bushing being adjustable with respect to the external bushing thereby allowing the manifold to be adjustable with respect to the casing.

18. The method of claim 17, wherein engaging the external bushing with the internal bushing comprises threadably engaging the external bushing with the internal bushing.

19. The method of claim 17, wherein attaching the mounting bolt to the casing comprises threadably engaging the mounting bolt to the casing.

20. The method of claim 17, further comprising providing the mounting bolt with a well at a proximal end thereof for a thermocouple.

* * * * *